United States Patent
Takada

(10) Patent No.: US 11,025,872 B2
(45) Date of Patent: Jun. 1, 2021

(54) DISPLAY CONTROLLER, DISPLAY SYSTEM, DISPLAY CONTROL METHOD AND NON-TRANSITORY STORAGE MEDIUM

(71) Applicant: JVCKENWOOD Corporation, Yokohama (JP)

(72) Inventor: Hiroyuki Takada, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/074,741

(22) Filed: Oct. 20, 2020

(65) Prior Publication Data

US 2021/0127099 A1  Apr. 29, 2021

(30) Foreign Application Priority Data

Oct. 25, 2019  (JP) .............................. JP2019-194054

(51) Int. Cl.
  *H04N 9/31*  (2006.01)
(52) U.S. Cl.
  CPC ......... *H04N 9/3179* (2013.01); *H04N 9/3147* (2013.01); *H04N 9/3194* (2013.01)
(58) Field of Classification Search
  CPC .............................................. G09G 2320/027
  See application file for complete search history.

(56) References Cited

U.S. PATENT DOCUMENTS

| | | | | |
|---|---|---|---|---|
| 8,165,417 B2 * | 4/2012 | Yamashita | ................. | G06T 5/40 382/274 |
| 2011/0254878 A1 * | 10/2011 | Mori | ..................... | G09G 3/2007 345/690 |
| 2012/0169789 A1 * | 7/2012 | Origuchi | .............. | G09G 3/2965 345/690 |
| 2017/0289508 A1 | 10/2017 | Fujioka | | |
| 2017/0323618 A1 * | 11/2017 | Takanashi | ............. | G09G 3/3607 |
| 2018/0025700 A1 * | 1/2018 | Suzuki | ..................... | G06T 5/009 345/589 |
| 2018/0033400 A1 * | 2/2018 | Nagashima | .............. | G09G 3/36 |
| 2019/0088193 A1 * | 3/2019 | Tada | .................... | G06F 3/04847 |
| 2020/0250800 A1 * | 8/2020 | Suzuki | ..................... | G06T 5/009 |

FOREIGN PATENT DOCUMENTS

JP  2017-181668  10/2017

* cited by examiner

*Primary Examiner* — Paulos M Natnael
(74) *Attorney, Agent, or Firm* — Amin, Turocy & Watson, LLP

(57) ABSTRACT

A display controller includes: an upper limit luminance value acquisition unit configured to acquire, for pixels of display devices, an upper limit luminance value of an absolute luminance value; a set luminance value setting unit configured to set a set luminance value so that the set luminance value is smaller than a maximum value among the upper limit luminance values; an input luminance value acquisition unit configured to acquire an input luminance value based on input data; an output gradation value generation unit configured to generate an output gradation value based on the input luminance value and the set luminance value; and an output controller configured to output the generated output gradation value, wherein the output gradation value generation unit is further configured to generate the output gradation value so that an output luminance value is equal to or smaller than the set luminance value.

10 Claims, 7 Drawing Sheets

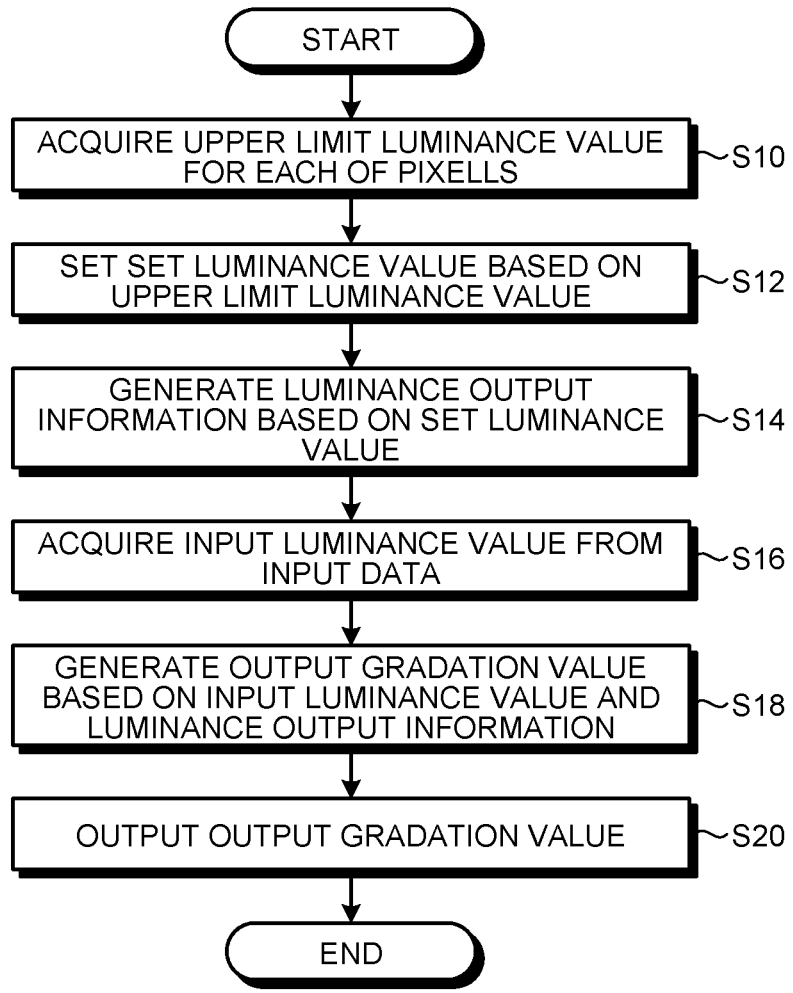

DISPLAY CONTROLLER, DISPLAY SYSTEM, DISPLAY CONTROL METHOD AND NON-TRANSITORY STORAGE MEDIUM

CROSS-REFERENCE TO RELATED APPLICATION

This application claims priority from Japanese Application No. 2019-194054, filed on Oct. 25, 2019, the contents of which are incorporated by reference herein in its entirety.

FIELD

The present application relates to a display controller, a display system, a display control method, and a non-transitory storage medium.

BACKGROUND

In recent years, there have been cases where input data including absolute luminance value information has been input to a display device as input data for displaying images. Such input data may include, for example, high dynamic range (HDR) signals and the like. A display device generates output data such that an image to be displayed has an absolute luminance value as defined by input data. For example, Japanese Laid-open Patent Publication No. 2017-181668 discloses that, when an absolute luminance range defined by input data differs from an absolute luminance range which can be displayed in a display, an image is displayed on the display so that the absolute luminance value of the image displayed by the display is less than a maximum value of the absolute luminance range of the display device.

However, in a projector or the like, for example, the maximum value of the absolute luminance which can be displayed is sometimes different at least for each pixel. In such cases, when an image is to be displayed with a uniform absolute luminance value, for example, although a designated absolute luminance value can be realized by pixels for which the maximum value of the displayable absolute luminance is large, it will likely not be possible for the designated absolute luminance value to be realized by pixels for which the maximum value of the displayable absolute luminance is small. In such cases, non-uniform luminance is visible in the image which is displayed. Hence, when an image is displayed based on input data in which an absolute luminance value is designated, the image needs to be suitably displayed so as to avoid causing a viewer any discomfort.

SUMMARY

A display controller, a display system, a display control method, and a non-transitory storage medium are disclosed.

According to one aspect, there is provided a display controller for controlling displaying of at least one image by at least one display device, comprising: an upper limit luminance value acquisition unit configured to acquire, for at least one of pixels of the at least one display device, an upper limit luminance value which is an upper limit value of an absolute luminance value which is capable of being displayed by the at least one display device; a set luminance value setting unit configured to set a set luminance value which is a set value of the absolute luminance value displayed by the at least one display device so that the set luminance value is smaller than a maximum value among the upper limit luminance values for each of the pixels; an input luminance value acquisition unit configured to acquire, for each of the pixels, an input luminance value which is the absolute luminance value to be displayed by the at least one display device based on data input to the at least one display device; an output gradation value generation unit configured to generate an output gradation value based on the input luminance value and the set luminance value; and an output controller configured to output the output gradation value generated by the output gradation value generation unit, wherein the output gradation value generation unit is further configured to generate the output gradation value for each of the pixels so that an output luminance value which is the absolute luminance value to be displayed by each of the pixels is equal to or smaller than the set luminance value for each of the pixels.

According to one aspect, there is provided a display control method for controlling displaying of at least one image by at least one display device, comprising: an upper limit luminance value acquisition step of acquiring, for at least one of pixels of the at least one display device, an upper limit luminance value which is an upper limit value of an absolute luminance value which is capable of being displayed by the at least one display device; a set luminance value setting step of setting a set luminance value which is a set value of the absolute luminance value displayed by the display device so that the set luminance value is smaller than a maximum value among the upper limit luminance values for each of the pixels; an input luminance value acquisition step of acquiring, for each of the pixels, an input luminance value which is an absolute luminance value to be displayed by the at least one display device based on data input to the at least one display device; an output gradation value generation step of generating an output gradation value based on the input luminance value and the set luminance value; and an output control step of outputting the output gradation value generated at the output gradation value generation step, wherein the output gradation value generation step further generates the output gradation value for each of the pixels so that an output luminance value which is the absolute luminance value to be displayed by each of the pixel is equal to or smaller than the set luminance value for each of the pixels.

According to one aspect, there is provided a non-transitory storage medium that stores a program that causes a computer to execute a display control method for controlling displaying of an image by a display device, the program causing the computer to execute: an upper limit luminance value acquisition step of acquiring, for at least one of pixels of the at least one display device, an upper limit luminance value which is an upper limit value of an absolute luminance value which is capable of being displayed by the at least one display device; a set luminance value setting step of setting a set luminance value which is a set value of the absolute luminance value displayed by the display device so that the set luminance value is smaller than a maximum value among the upper limit luminance values for each of the pixels; an input luminance value acquisition step of acquiring, for each of the pixels, an input luminance value which is an absolute luminance value to be displayed by the at least one display device based on data input to the at least one display device; an output gradation value generation step of generating an output gradation value based on the input luminance value and the set luminance value; and an output control step of outputting the output gradation value generated at the output gradation value generation step, wherein the output gradation value generation step further generates the output gradation value for each of the pixels so that an output luminance value which is the absolute luminance value to be displayed by each of the pixel is equal to or smaller than the set luminance value for each of the pixels.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 10 is a flowchart illustrating a process flow of generating and outputting the output gradation values according to the present embodiment.

DETAILED DESCRIPTION OF THE PREFERRED EMBODIMENTS

Embodiments of the present application will be described in detail hereinbelow based on the drawings. Note that the present application is not limited to or by the embodiment described hereinbelow.

Figure 1:
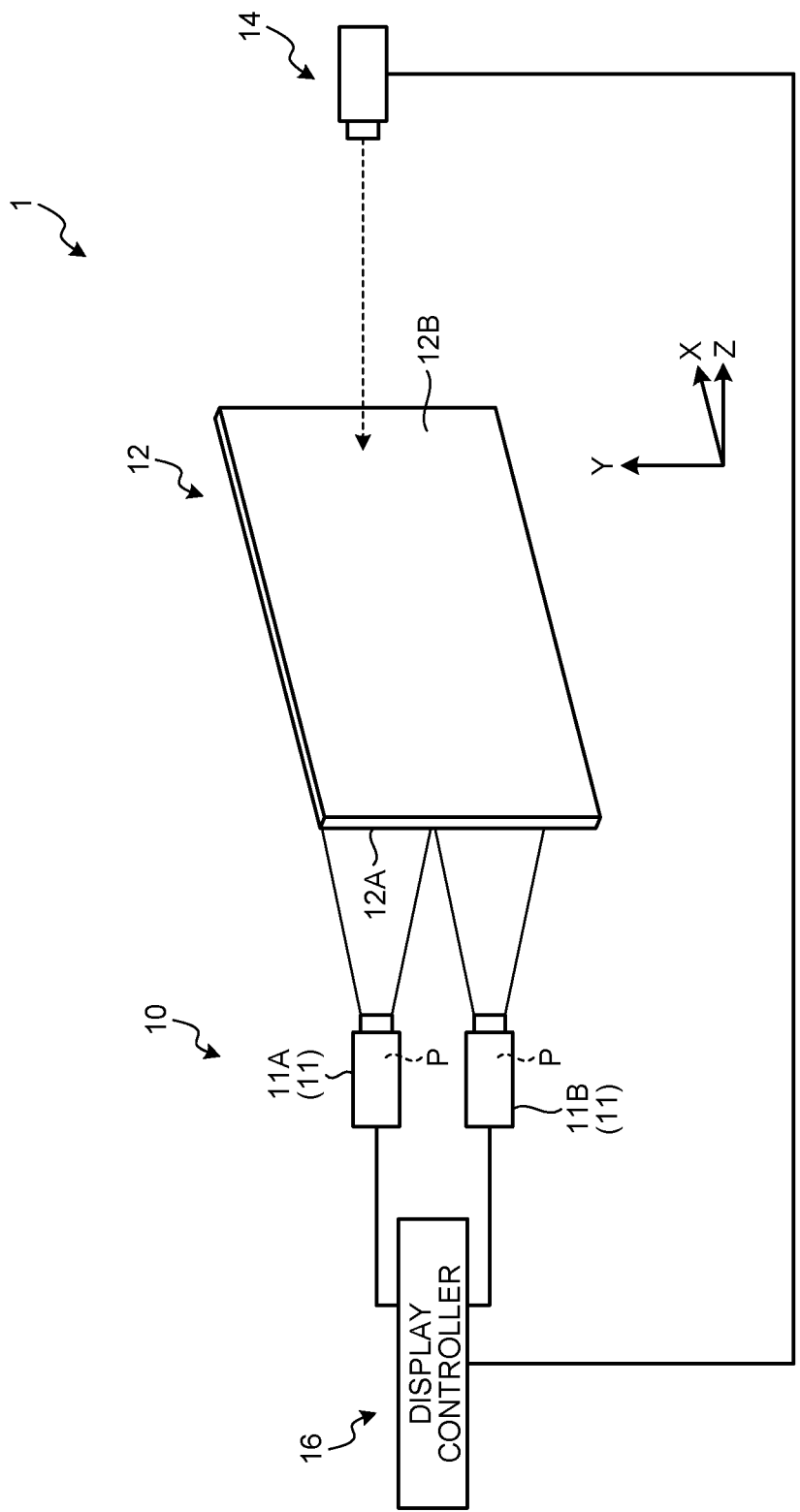
FIG. 1 is a schematic diagram of a display system according to a first embodiment.

FIG. 1 is a schematic diagram of a display system according to the first embodiment. As illustrated in FIG. 1, a display system 1 according to the present embodiment includes a projection system 10, a screen 12, a luminance detection device 14, and a display controller 16.

The projection system 10 is a system for displaying images. In the present embodiment, the projection system 10 includes multiple display devices 11. The display devices 11 are devices for displaying images, and in the present embodiment, the display devices 11 displays images on the screen 12 by emitting light toward the screen 12 and projecting the light onto the screen 12. In other words, in the present embodiment, the display devices 11 are image projection devices (projectors).

The display devices 11 are each arranged side by side in predetermined positions and project light (an image) in a set region on the screen 12 by projecting the image in a predetermined direction. The images from the display devices 11 are thus arranged side by side on the screen 12, and one whole image is constituted by all of the images. That is, each of the display devices 11 projects the image in a region which is a part of the whole image. Note that, although two display devices 11A and 11B are provided as display devices 11 in the example of FIG. 1, the number of display devices 11 is not limited to two, and three or more may be provided.

Each of the display devices 11 includes multiple pixels P for emitting light. When a region of the screen 12 where an image is displayed is segmented into unit regions, each of the pixels P emits the light to each of the unit regions. An image displayed by the display devices 11 is formed by the light from each of the pixels P projected onto each of the unit regions. In other words, it could be said that when an image 100 which is displayed by the display devices 11 is segmented into unit regions, one pixel P is in charge of an image of one unit region. That is, a pixel P corresponds to a unit region of the image 100 (screen 12).

The screen 12 is a screen (an image display surface) onto which an image (light) from the display devices 11 is projected and that displays the projected image. A back surface 12A of the screen 12 is disposed on the display devices 11 side. An image (light) from the display devices 11 is emitted to the back surface 12A of the screen 12 and the image (light) is transmitted therethrough to be displayed on a front surface 12B on the side opposite to the back surface 12A. That is, the screen 12 is a transmission-type screen. However, the screen 12 is not limited to a transmission-type screen. For example, the screen 12 may have an image projected onto its front surface 12B and display an image through reflection of the image. Furthermore, although the screen 12 is planar in the example of FIG. 1, the screen 12 is not limited to being planar and may be of any shape. For example, the screen 12 may be a cylindrical screen in which one surface of the back surface 12A and the front surface 12B is concave, while the other of these surfaces is convex.

Hereinbelow, a direction X denotes a direction along the surface of the screen 12 and a direction Y denotes a direction along the surface of the screen 12 and intersecting direction X. In the example of the present embodiment, the direction Y is orthogonal to the direction X. Furthermore, a direction Z is a direction that is orthogonal to the direction X and the direction Y. The direction Z is also said to be a travelling direction of the light emitted to the screen 12 from the display devices 11.

Figure 2:
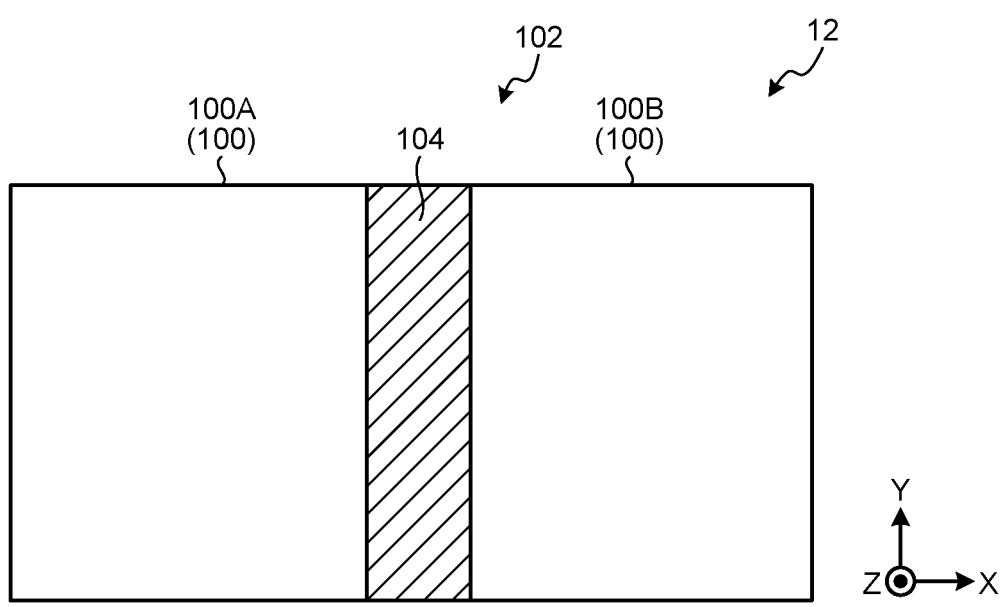
FIG. 2 is a schematic diagram illustrating an example of a whole image displayed by a display device.

FIG. 2 is a schematic diagram illustrating an example of a whole image displayed by the display device. FIG. 2 illustrates an example of a whole image 102 which is projected onto the screen 12. The whole image 102 includes multiple images 100 which are projected from the respective display devices 11, and the whole image 102 is formed by arranging the multiple images 100 side by side in a direction along the surface of the screen 12. Adjacent images 100 overlap in a partial region. An image which is formed by overlapping parts of the images one another is referred to as a superimposed image 104 hereinbelow. In the example in FIG. 2, the whole image 102 includes an image 100A which is an image 100 projected from a display device 11A and an image 100B which is an image 100 projected from a display device 11B, and the images 100A and 100B are arranged side by side along the direction X. A partial region of the image 100A on the image 100B side and a partial region of the image 100B on the image 100A side are superimposed on each other, thereby forming the superimposed image 104. The display devices 11A and 11B display images with the same content in the region where the images 100A and 100B are superimposed on each other. Hence, the superimposed image 104 has an enhanced luminance by overlapping identical images one another.

Note that, although the projection system 10 according to the present embodiment includes the multiple display devices 11, the number of display devices 11 is not limited to the plural and may be one. In this case, the image which is projected by the one display device 11 is a whole image.

Returning to FIG. 1, the luminance detection device 14 is a device for detecting the absolute luminance value of the images displayed on the screen 12 from the display devices 11. The luminance detection device 14 detects the absolute luminance value for each of the unit regions in the whole image 101 displayed on the screen 12. In other words, it could be said that the luminance detection device 14 detects, for each of the pixels P, the absolute luminance value of the light projected by the pixels P of the display devices 11 onto the screen 12. In the present embodiment, the luminance detection device 14 is a luminance sensor. The luminance detection device 14 is disposed on the front surface 12B side of the screen 12, and detects the luminance of the front surface 12B of the screen 12. The luminance detection device 14 detects the absolute luminance value of the light projected onto the screen 12 by the pixels P by detecting the absolute luminance value for each unit region of the front surface 12B of the screen 12. However, the luminance detection device 14 is not limited to being disposed on the front surface 12B side of the screen 12 and may also be disposed between the back surface 12A of the screen 12 and the display devices 11. In this case, the luminance detection device 14 detects, for each pixel P, the luminance of the light emitted toward the screen 12 from the display devices 11. That is, the luminance detection device 14 may be capable of detecting the luminance of the light emitted from the display devices 11.

Note that, as long as the luminance detection device 14 is a device capable of detecting absolute luminance values, the luminance detection device 14 is not limited to a luminance sensor. For example, the luminance detection device 14 may include a camera for capturing the images displayed on the screen 12 from the display devices 11. In this case, the luminance detection device 14 captures the whole image 101 displayed on the screen 12 and detects a gradation value for each of the unit regions, that is, for each of the pixels P. Further, the luminance detection device 14 detects the absolute luminance value for each of the pixels P by converting the gradation value to the absolute luminance values. Any method may be used to convert the gradation values to the absolute luminance values. For example, information indicating a relationship between the gradation values and the absolute luminance values of the luminance detection device 14 may be stored in advance, and the gradation values may be converted to the absolute luminance values based on this relationship. Furthermore, the luminance sensor that detects the absolute luminance values of a part of the unit regions of the whole image 101 may be provided in addition to a camera as the luminance detection device 14. Further, the information indicating the relationship between the gradation values and the absolute luminance may be created based on the absolute luminance values of the unit regions detected by the luminance sensor and the gradation values of the same unit regions. The absolute luminance value for each of the unit regions (each of the pixels P) is detected by applying this information to all the unit regions.

In the above description, the luminance detection device 14 detects the absolute luminance value for each of the pixels P (each of the unit regions). When the resolution of the luminance detection device 14 is low, for example, the absolute luminance value may be detected for the multiple pixels P (for the multiple unit regions).

Figure 3:
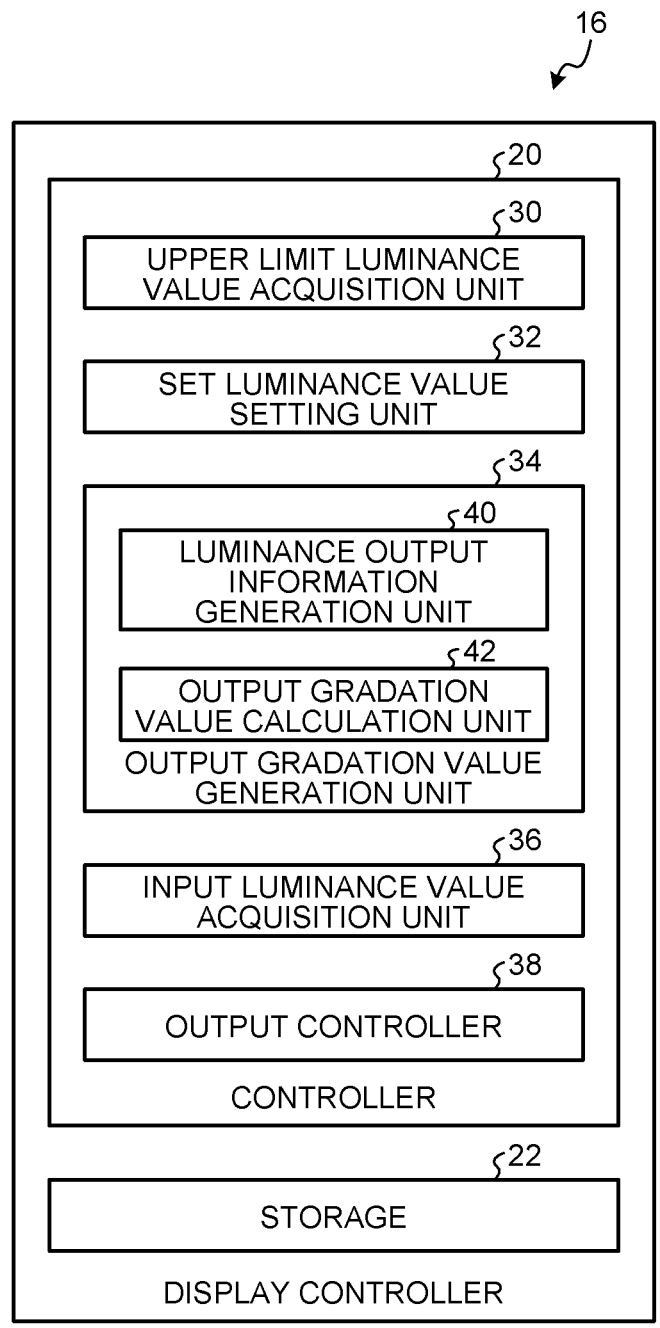
FIG. 3 is a schematic block diagram of a display controller according to the present embodiment.

The display controller 16 is a controller for controlling to display the images by the display devices 11. FIG. 3 is a schematic block diagram of a display controller according to the present embodiment. The display controller 16 is a computer in the present embodiment and includes a controller 20 and a storage 22, as illustrated in FIG. 3. The controller 20 is an arithmetic and logic unit, that is, a central processing unit (CPU). The storage 22 is a memory that stores computation content of the controller 20 and program information and the like and includes, for example, at least one of a main storage device such as a random-access memory (RAM) or a read-only memory (ROM), and an external memory device such as a hard disk drive (HDD). The display controller 16 collectively controls all of the multiple display devices 11 but may be provided on a one-to-one basis for each of the multiple display devices 11.

The controller 20 acquires input data for causing the display devices 11 to display an image and, based on the input data, generates output gradation values T with which the display devices 11 are to project/output the image and outputs the output gradation values T to the display devices 11. The display devices 11 project the image with the output gradation values T. The input data is image data indicating an image to be displayed by the display device 11 and may also be referred to as input gradation values. The input data also includes information about the absolute luminance value of the image to be displayed by the display devices 11. The input data is data for each of the pixels P, and hence may also be said to include information indicating the absolute luminance value for each of the pixels P. The absolute luminance value for each of the pixels P included in the input data is referred to hereinbelow as an input luminance value LB. Note that the input data is an HDR signal, for example, and may be image data in any format. The output gradation values T are output data with which the display devices 11 actually output the image. In other words, the display devices 11 cause the pixels P to project light with the output gradation values T. Note that the output gradation values T are gradation value data, and hence do not contain information of the absolute luminance values.

The controller 20 includes an upper limit luminance value acquisition unit 30, a set luminance value setting unit 32, an output gradation value generation unit 34, an input luminance value acquisition unit 36, and an output controller 38. The upper limit luminance value acquisition unit 30, the set luminance value setting unit 32, the output gradation value generation unit 34, the input luminance value acquisition unit 36, and the output controller 38 are realized by the controller 20 reading software/programs stored in the storage 22, and execute processing which will be described below. The details will be described subsequently, but the controller 20 generates output gradation values T based on input data and luminance output information by the output gradation value generation unit 34, outputs the generated output gradation values T to the display devices 11 by the output controller 38, and causes the display devices 11 to display/project an image with the generated output gradation values T. Functions of each part of the controller 20 will be specifically described hereinbelow.

The upper limit luminance value acquisition unit 30 acquires an upper limit luminance value LS for each of the pixels P of the display devices 11. The upper limit luminance value LS is an upper limit value for the absolute luminance value which is capable of being displayed by the display devices 11. More precisely, the upper limit luminance value LS is a maximum value of the absolute luminance values of light which the pixel P is capable of projecting onto the screen 12, and could be said to be the absolute luminance value of the light when the pixel P projects the light onto the screen 12 with the maximum output gradation value T. In the present embodiment, the controller 20 causes each of the pixels P of the multiple display devices 11 to display the image (to project the light) at a maximum output gradation value $T_{max}$. The maximum output gradation value $T_{max}$ is a maximum value of the output gradation value T. For example, when the output gradation value T can have any integer value from 0 to 255, the maximum output gradation value $T_{max}$ is 255. On the screen 12A, the whole image 101 projected by the light from each of the pixels P with the maximum output gradation value $T_{max}$ is displayed. The upper limit luminance value acquisition unit 30 causes the luminance detection device 14 to detect, for each of the unit regions, that is, for each of the pixels P, the absolute luminance value of the whole image 101 output with the maximum output gradation value $T_{max}$. The upper limit luminance value acquisition unit 30 acquires, as the upper limit luminance value LS, the absolute luminance value which is output with the maximum output gradation value $T_{max}$ and detected by the luminance detection device 14 for each of the pixels P.

Thus, the upper limit luminance value acquisition unit 30 acquires, as the upper limit luminance value LS, the absolute luminance value for each of the pixels P detected by the luminance detection device 14 when the display devices 11 are made to output the image with the maximum output gradation value $T_{max}$. However, the luminance detection device 14 is not limited to detecting the absolute luminance value when the image is made to be output with the maximum output gradation value $T_{max}$. The luminance detection device may detect the absolute luminance value for each of the pixels P when each of the pixels P is made to output the image with a predetermined maximum output gradation value T. In this case, the upper limit luminance value acquisition unit 30 converts the absolute luminance value for each of the pixels P detected by the luminance detection device 14 to the absolute luminance value when the image is output with the maximum output gradation value $T_{max}$, and this converted value is taken as the upper limit luminance value LS.

Furthermore, in a case where the luminance detection device 14 detects the absolute luminance value for the multiple pixels P, the upper limit luminance value acquisition unit 30 acquires the upper limit luminance value LS for each of the pixels P based on the absolute luminance value for the multiple pixels P detected by the luminance detection device 14. In this case, the upper limit luminance value acquisition unit 30 converts the absolute luminance value for the multiple pixels P detected by the luminance detection device 14 to the upper limit luminance value LS for each of the pixels P, thereby acquiring the upper limit luminance value LS for each of the pixels P. For example, when the luminance detection device 14 detects a predetermined absolute luminance value for a group of the pixels P, the upper limit luminance value acquisition unit 30 sets the predetermined absolute luminance value as the upper limit luminance value LS for each of the pixels P contained in the group of the pixels P. Further, the upper limit luminance value acquisition unit 30 is not limited to acquiring the upper limit luminance value LS for each of the pixels P and may acquire the upper limit luminance value LS for the multiple pixels P. In other words, it could be said that the upper limit luminance value acquisition unit 30 may acquire the upper limit luminance value LS for each of the pixels P or for the multiple pixels P, that is, at least for each of the pixels P.

Figure 4:
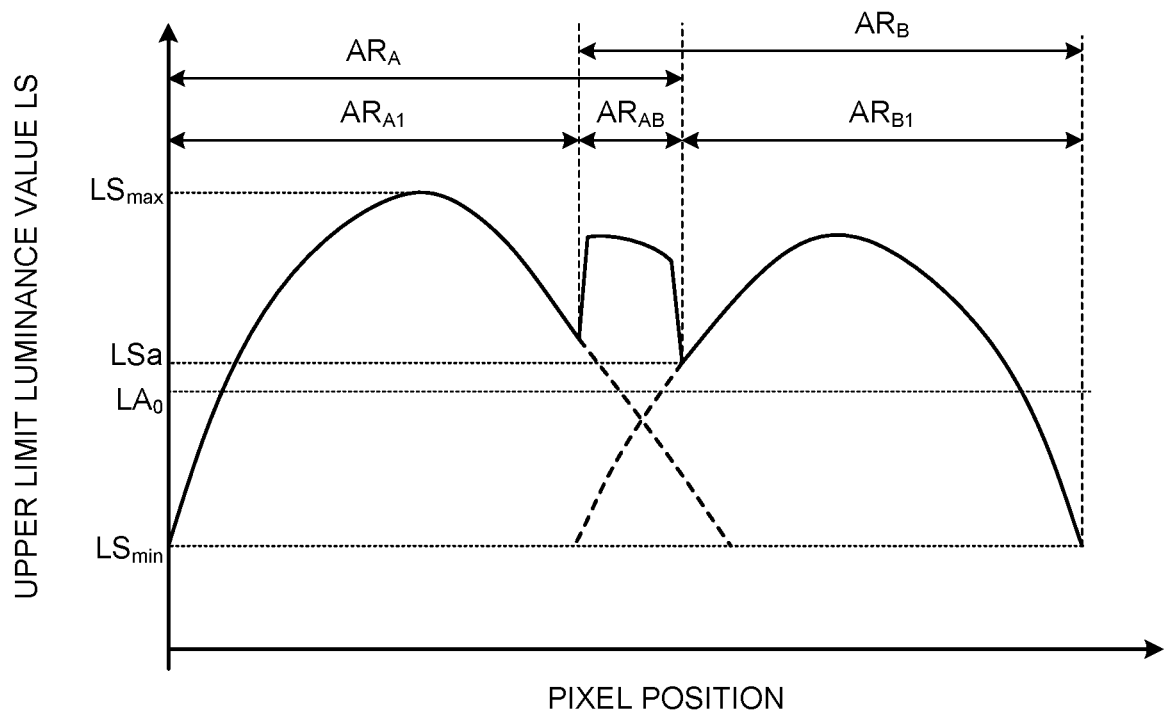
FIG. 4 is a graph illustrating an example of upper limit luminance values for each pixel.

FIG. 4 is a graph illustrating an example of an upper limit luminance value for each of the pixels P. The horizontal axis in FIG. 4 represents a position of the pixel P, that is, the coordinates of the pixel P, and the vertical axis represents the upper limit luminance value LS for each of the pixels P. Each of the pixels P corresponds to each of the unit regions of the image, and hence the horizontal axis of FIG. 4 may also be said to indicate the position/coordinates of the unit region on the screen 12. The horizontal axis of FIG. 4 represents each of the pixels P in the X direction, that is, in a direction in which the images 100A and 100B of the display devices 11A and 11B are adjacent to each other. That is, the upper limit luminance values LS for each of the pixels P in the X direction are illustrated in the example of FIG. 4.

As illustrated in FIG. 4, the upper limit luminance value LS is sometimes different for each of the pixels P or for the multiple pixels P (that is, at least for each of the pixels P). In other words, even when the display devices 11 output the image with the same output gradation value T (the maximum output gradation value $T_{max}$ here) for each of the pixels P, the absolute luminance value (the upper limit luminance value LS here) of the image which is actually displayed is sometimes different for each of the pixels P or is sometimes different for the multiple pixels P. More precisely, the upper limit luminance value LS of the pixel P in the center of the display device 11 is the maximum value, and the upper limit luminance value LS of the pixel P decreases as the position thereof is away from the center. In the example of FIG. 4, the upper limit luminance value LS of the pixels P of the display device 11A is indicated in an interval $AR_A$, and the upper limit luminance value LS of the pixels P of the display device 11B is indicated in an interval $AR_B$. As indicated by the intervals $AR_A$ and $AR_B$, the upper limit luminance value LS of the pixel P in the center in the X direction of the display devices 11A and 11B is the maximum value, and the upper limit luminance value LS of the pixel P decreases as the position thereof is away from the center in the X direction. However, the images of the display devices 11A and 11B are superimposed on each other in a partial region. Hence, in an interval $AR_{AB}$ in which the images are superimposed on each other, that is, in the superimposed image 104 (see FIG. 2), the absolute luminance value becomes larger due to an overlap of the light of the pixels P of the display device 11A and the light of the pixels P of the display device 11B.

The upper limit luminance values LS for each of the pixels P will be further described specifically. Here, in the interval $AR_A$ of the display device 11A, an interval that does not overlap the interval $AR_B$ of the display device 11B is denoted as an interval $AR_{A1}$, and in the interval $AR_B$ of the display device 11B, an interval that does not overlap the interval $AR_A$ of the display device 11A is denoted as an interval $AR_{B1}$. In this case, the upper limit luminance value LS increases in moving toward the center pixel P in direction X of the display device 11A from the pixel P at the end of the interval $AR_{A1}$ on the side opposite to the interval $AR_{AB}$, and decreases in moving from the center pixel P of the display device 11A toward the pixel P at the end of the interval $AR_{A1}$ on the interval $AR_{AB}$ side (a boundary position between the interval $AR_{A1}$ and the interval $AR_{AB}$). Further, the upper limit luminance value LS increases toward the interval $AR_{B1}$ side from the pixel P at the end of the interval $AR_{AB}$ on the interval $AR_{A1}$ side (a boundary position between the interval $AR_{AB}$ and the interval $AR_{A1}$). Thus, because the upper limit luminance value LS switches from decreasing to increasing in a position at the boundary between the interval $AR_{AB}$ and the interval $AR_{A1}$, there is an inflection point, that is, a minimal value, in a position at the boundary between the interval $AR_{AB}$ and the interval $AR_{A1}$.

The upper limit luminance value LS becomes smaller in moving toward the interval $AR_{B1}$ around the end of the interval $AR_{AB}$ on the interval $AR_{B1}$ side (a boundary position between the interval $AR_{AB}$ and the interval $AR_{B1}$). Further, in the interval $AR_{B1}$, the upper limit luminance value LS becomes larger in moving toward the center pixel P in direction X of the display device 11B from the pixel P at the end of the interval $AR_{B1}$ on the interval $AR_{AB}$ side (a boundary position between the interval $AR_{B1}$ and the interval $AR_{AB}$), and decreases in moving from the center pixel P of the display device 11B toward the pixel P at the end of the interval $AR_{B1}$ on the side opposite to the interval $AR_{AB}$. Thus, since the upper limit luminance value LS switches from decreasing to increasing in a position at the boundary between the interval $AR_{AB}$ and the interval $AR_{B1}$, there is an inflection point, that is, a minimal value, in a boundary position between the interval $AR_{AB}$ and the interval $AR_{B1}$. Note that, in the example of FIG. 4, the upper limit luminance value LS of the pixel P in the boundary position between the interval $AR_{AB}$ and the interval $AR_{B1}$ has a smaller value than the upper limit luminance value LS of the pixel P in the position between the interval $AR_{AB}$ and the interval $AR_{A1}$, but a magnitude relationship therebetween is not limited thereto.

Furthermore, the upper limit luminance value LS of the pixel P in the boundary position between the interval $AR_{AB}$ and the interval $AR_{A1}$ and the upper limit luminance value LS of the pixel P in the boundary position between the interval $AR_{AB}$ and the interval $AR_{B1}$ are minimal values but are larger than the upper limit luminance values LS of the pixels P at the end of the interval $AR_{A1}$ on the side opposite to the interval $AR_{AB}$ and at the end of the $AR_{B1}$ on the side opposite to the interval $AR_{AB}$. In other words, the upper limit luminance value LS of the pixel P at the boundary between a region where the images do not overlap and a region where the images overlap is larger than the upper limit luminance value LS of the pixel P near the ends of the image in regions where the images do not overlap (both ends in the X direction here). Furthermore, in the example of FIG. 4, the upper limit luminance values LS of the pixels P at the ends of the image in regions where the images do not overlap are minimum values among the upper limit luminance values LS of the pixels P arranged side by side in the X direction. That is, the upper limit luminance values LS of the pixels P at the end on the side of the interval $AR_{A1}$ opposite to the interval $AR_{AB}$ and at the end of the interval $AR_{B1}$ on the side opposite to the interval $AR_{AB}$ are the minimum values among the upper limit luminance values LS of the pixels P arranged side by side in the X direction. However, the upper limit luminance values LS of these pixels P may be different values, or one of the upper limit luminance values LS thereof may be a minimum value. Furthermore, in the example of FIG. 4, although the upper limit luminance value LS of the center pixel P of the display device 11A is the maximum value among the upper limit luminance values LS of the pixels P arranged side by side in the X direction, the present embodiment is not limited to this arrangement, and the upper limit luminance value LS of the center pixel P of the display device 11B, for example, may be the maximum value or the upper limit luminance values LS of the center pixels P of the display devices 11A and 11B may be equal.

Note that a distribution of the upper limit luminance values LS in FIG. 4 is an example. For example, when the images are not superimposed on each other, the distribution is such that the upper limit luminance value LS of the center pixel P is the maximum value and the upper limit luminance value LS decreases toward both ends in the X direction.

The set luminance value setting unit 32 sets a set luminance value LA0 based on the upper limit luminance value LS for each of the pixels P acquired by the upper limit luminance value acquisition unit 30. The set luminance value LA0 is a set value for the absolute luminance value displayed by the display devices 11 and is set as a value that is common to all the pixels P. The set luminance value setting unit 32 sets the set luminance value LA0 so that the set luminance value LA0 is smaller than a maximum upper limit luminance value $LS_{max}$ which is the maximum value among each of the upper limit luminance values LS for each of the pixels P. More preferably, supposing that the minimum value among each of the upper limit luminance values LS for each of the pixels P is a minimum upper limit luminance value $LS_{min}$, the set luminance value setting unit 32 sets the set luminance value LA0 so that the set luminance value LA0 is larger than the minimum upper limit luminance value $LS_{min}$ and smaller than the maximum upper limit luminance value $LS_{max}$.

Furthermore, the set luminance value setting unit 32 preferably sets the set luminance value LA0 based on the upper limit luminance values LS of the pixels P in an area where the parts of the images are superimposed on each other (the interval $AR_{AB}$ in the example of FIG. 4). More precisely, the set luminance value setting unit 32 preferably sets the set luminance value LA0 so that the set luminance value LA0 is equal to or smaller than the upper limit luminance values LS of the pixels P in the area where the part of the image are superimposed on each other (the interval $AR_{AB}$ in the example of FIG. 4). Moreover, the upper limit luminance value LS of the pixels P in the boundary position a between the region where the images are not superimposed on each other (intervals $AR_{A1}$ and $AR_{B1}$ in the example of FIG. 4) and the region where the images are superimposed on each other (the interval $AR_{AB}$ in the example of FIG. 4) is a boundary upper limit luminance value LSa. In this case, the set luminance value setting unit 32 preferably sets the set luminance value LA0 so that the set luminance value LA0 is larger than the minimum upper limit luminance value $LS_{min}$ and equal to or smaller than the boundary upper limit luminance value LSa. Note that it could also be said that the boundary upper limit luminance value LSa is a minimal value upper limit luminance value LS in a boundary position between the region where the images are not superimposed on each other and the region where the images are superimposed on each other. Furthermore, when there are multiple pixels P for which the upper limit luminance values LS are minimal values, the upper limit luminance value LS of the pixel P with the minimum upper limit luminance value LS among the pixels P for which the upper limit luminance values LS are minimal values is preferably the boundary upper limit luminance value LSa. In other words, the upper limit luminance value LS of the pixel P for which the upper limit luminance value LS is a minimum value among the pixels P in the region where the images are superimposed on each other (the interval $AR_{AB}$ in the example of FIG. 4) is preferably the boundary upper limit luminance value LSa. That is, since the upper limit luminance value LS of the pixel P in the boundary position between the interval $AR_{AB}$ and the interval $AR_{B1}$ has a smaller value than the upper limit luminance value LS of the pixel P in the boundary position between the interval $AR_{AB}$ and the interval $AR_{A1}$ in the example of FIG. 4, the upper limit luminance value LS of the pixel P in the boundary position between the interval $AR_{AB}$ and the interval $AR_{B1}$ is set as the boundary upper limit luminance value LSa.

The output gradation value generation unit 34 generates an output gradation value T based on the set luminance value LA0 set by the set luminance value setting unit 32 and an input luminance value LB of the input data acquired by the input luminance value acquisition unit 36 which will be described later. More specifically, the output gradation value generation unit 34 includes a luminance output information generation unit 40 and an output gradation value calculation unit 42, and generates luminance output information by the luminance output information generation unit 40, and calculates output gradation values based on the luminance output information and the input luminance value LB by the output gradation value calculation unit 42.

The luminance output information generation unit 40 generates the luminance output information based on the upper limit luminance value LS and the set luminance value LA0. The luminance output information generation unit 40 generates the luminance output information for each of the pixels P. The luminance output information is information indicating a relationship between the input luminance value LB of the input data and the output gradation value T, in other words, indicating the relationship between the absolute luminance value instructed in the input data and the output gradation values output to the display devices 11. Hence, as long as the input luminance value LB is determined, the output gradation values can be calculated by the luminance output information.

The luminance output information generation unit 40 generates the luminance output information representing the relationship between the input luminance value LB and the output gradation value T by establishing a first relationship between the input luminance value LB and the output luminance value LA and a second relationship between the output luminance value LA and the output gradation value T. In other words, the luminance output information is information that includes the first relationship and the second relationship. The luminance output information generation unit 40 defines, as the first relationship, the relationship between the input luminance value LB which is the absolute luminance value instructed in input data, and the output luminance value LA which is the absolute luminance value actually to be implemented by each of the pixels P. Further, the luminance output information generation unit 40 defines, as the second relationship, the relationship between the output luminance value LA which is defined by the first relationship and the output gradation value T which is the gradation value to be output by each of the pixels P. That is, when a certain input luminance value LB is instructed by the input data, the output luminance value LA associated with the input luminance value LB can be calculated according to the first relationship, and the output gradation value T with which the calculated output luminance value LA can be implemented can be calculated according to the second relationship.

Furthermore, the luminance output information generation unit 40 divides the pixels P into first pixels for which the upper limit luminance value LS is equal to or larger than the set luminance value LA0, and second pixels for which the upper limit luminance value LS is less than the set luminance value LA0, and generates the luminance output information by different methods for the first and second pixels. The specifics will be described hereinbelow.

Figure 5:
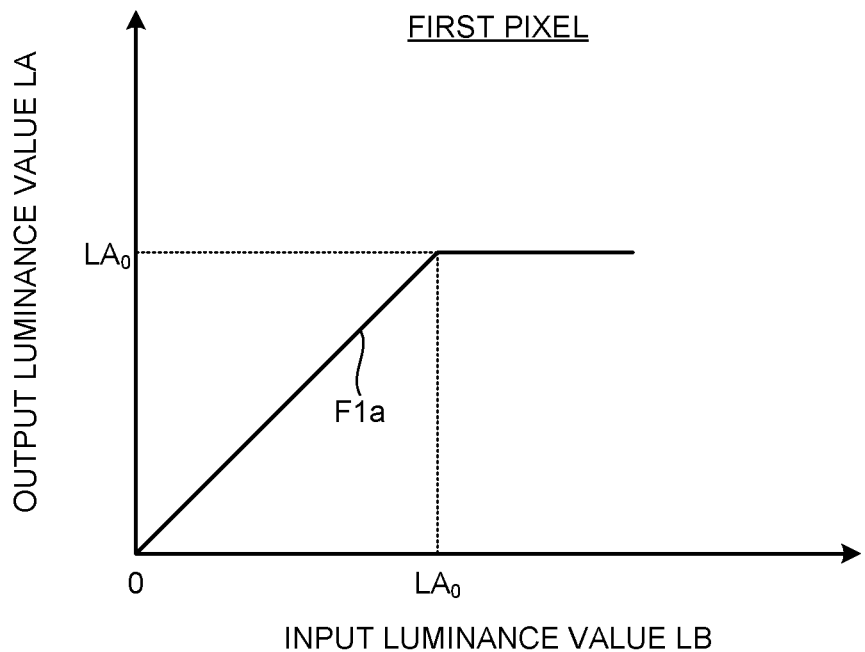
FIG. 5 is an example of a graph for illustrating luminance output information for a first pixel.
Figure 6:
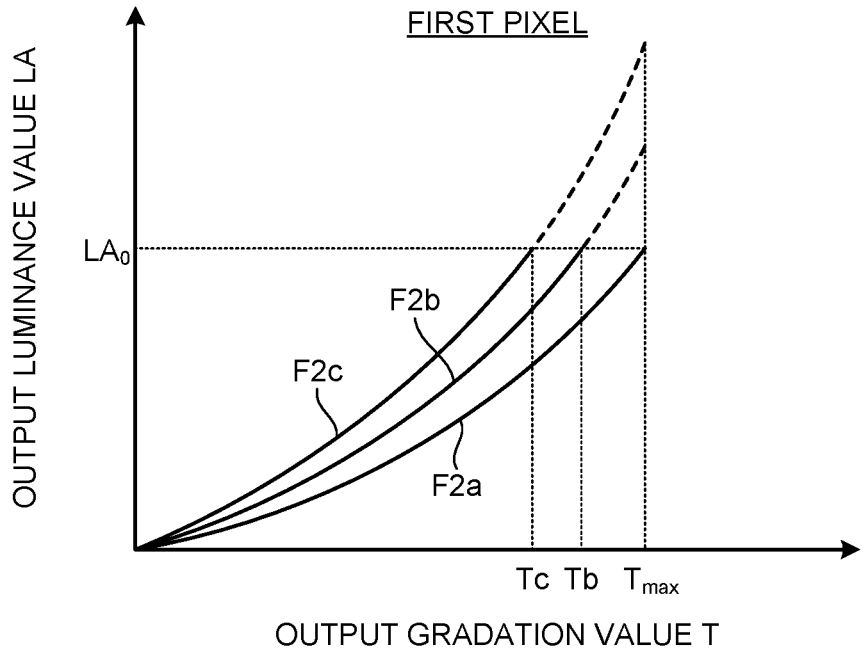
FIG. 6 is an example of a graph for illustrating luminance output information for the first pixel.

FIGS. 5 and 6 are examples of graphs for illustrating the luminance output information for the first pixels. FIG. 5 is a graph illustrating an example of the relationship (first relationship) between the input luminance value LB and the output luminance value LA. As indicated by a line segment F1a in FIG. 5, the luminance output information generation unit 40 establishes the first relationship for the first pixels so that, when the input luminance value LB is equal to or smaller than the set luminance value LA0, the output luminance value LA corresponds to the same value as the input luminance value LB. On the other hand, the luminance output information generation unit 40 establishes the first relationship for the first pixels so that, when the input luminance value LB is larger than the set luminance value LA0, the output luminance value LA corresponds to the set luminance value LA0. That is, in a range where the input luminance value LB is equal to or smaller than the set luminance value LA0, the output luminance value LA corresponds to a value that depends on the input luminance value LB, and in a range where the input luminance value LB is larger than the set luminance value LA0, the output luminance value LA does not depend on the input luminance value LB and corresponds to the set luminance value LA0 which is a fixed value. Therefore, even when it is instructed via the input luminance value LB that the absolute luminance value be larger than the set luminance value LA0, the output luminance value LA which is actually output as the absolute luminance value is held at the set luminance value LA0.

FIG. 6 is a graph illustrating an example of the relationship (second relationship) between the output luminance value LA and the output gradation value T. The luminance output information generation unit 40 calculates the second relationship of the first pixels based on the upper limit luminance value LS. Here, it could be said that the relationship between the output luminance value LA and the output gradation value T is a so-called gamma curve representing the relationship between the luminance values and the gradation values. The gamma value of the gamma curve is decided based on a characteristics of the display devices 11 and can therefore be acquired beforehand. The luminance output information generation unit 40 sets the output luminance value LA of the maximum output gradation value $T_{max}$ as the upper limit luminance value LS, and applies the gamma value to calculate, for each of the pixels P, the second relationship between the output luminance value LA and the output gradation value T. Moreover, the luminance output information generation unit 40 restricts the value of the output gradation value T in the second relationship so that the output luminance value LA is a value equal to or smaller than the set luminance value LA0.

For example, a line segment F2a in FIG. 6 represents the second relationship of the pixels P for which the upper limit luminance value LS is the set luminance value LA0. For the line segment F2a, since the upper limit luminance value LS is the set luminance value LA0, the output luminance value LA (the upper limit luminance value LS) for the maximum output gradation value $T_{max}$ is the set luminance value LA0. That is, the luminance output information generation unit 40 establishes the second relationship for the pixels P for which the upper limit luminance value LS is the set luminance value LA0 so that the output gradation value T lies within the range from a minimum value (zero here) to the maximum output gradation value $T_{max}$.

Meanwhile, a line segment F2b represents the second relationship of the pixels P for which the upper limit luminance value LS is larger than the set luminance value LA0, and a line segment F2c represents the second relationship of the pixels P for which the upper limit luminance value LS is larger than that of the pixels P of the line segment F2b. For the line segments F2b and F2c, since the upper limit luminance value LS is larger than the set luminance value LA0, the output luminance value LA (the upper limit luminance value LS) at the maximum output gradation value $T_{max}$ is larger than the set luminance value LA0. However, the luminance output information generation unit 40 sets the output luminance value LA to be equal to or smaller than the set luminance value LA0 in the first relationship. Therefore, the luminance output information generation unit 40 establishes the second relationship so that, for the pixels P for which the upper limit luminance value LS is larger than the set luminance value LA0, the output gradation value T lies within a range from a minimum value (zero here) to an output gradation value with which the upper limit luminance value LS corresponds to the set luminance value LA0, that is, the maximum value of possible output gradation values T is smaller than the maximum output gradation value $T_{max}$. In other words, the luminance output information generation unit 40 restricts the value of the output gradation value T so that the output gradation value T does not have a larger value than the output gradation value with which the upper limit luminance value LS corresponds to the set luminance value LA0. In the example of FIG. 6, the maximum value Tb of the possible output gradation values T for the pixels P of the line segment F2b corresponds to the output gradation value T for which the output luminance value LA is the set luminance value LA0, and is a smaller value than the maximum output gradation value $T_{max}$. Similarly, the maximum value Tc of the possible output gradation values T for the pixels P of the line segment F2c corresponds to the output gradation value T for which the output luminance value LA is the set luminance value LA0, and is a smaller value than the maximum output gradation value $T_{max}$.

Figure 7:
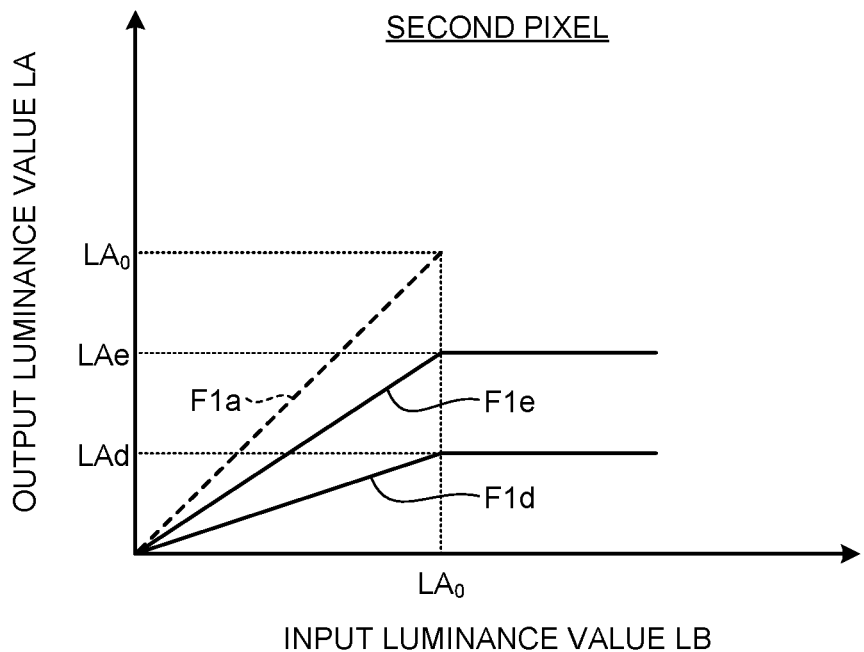
FIG. 7 is an example of a graph for illustrating luminance output information for a second pixel.
Figure 8:
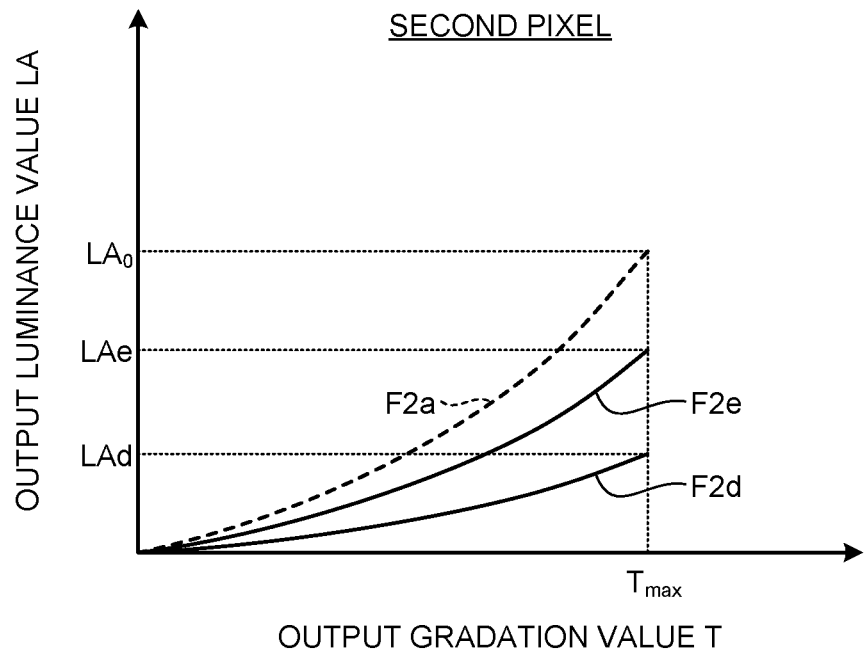
FIG. 8 is an example of a graph for illustrating luminance output information for the second pixel.

Next, the method of generating luminance output information for the second pixels will be described. FIGS. 7 and 8 are examples of graphs for illustrating the luminance output information for the second pixels. FIG. 7 is a graph illustrating an example of the relationship (first relationship) between the input luminance value LB and the output luminance value LA. Each of a line segment F1d and a line segment F1e in FIG. 7 represents the first relationship of the second pixels for which the upper limit luminance value LS is smaller than the set luminance value LA0. The luminance output information generation unit 40 establishes the first relationship for the second pixels so that, when the input luminance value LB is equal to or larger than the set luminance value LA0, the output luminance value LA corresponds to the same value as the upper limit luminance value LS. That is, for the second pixels, when the input luminance value LB is equal to or larger than the set luminance value LA0, the output luminance value LA does not depend on the input luminance value LB and corresponds to an upper limit luminance value LS which is smaller than the set luminance value LA0. Note that the upper limit luminance value LS is a fixed value but is different for each of the pixels P. In the example of the line segment F1d, when the input luminance value LB is equal to or larger than the set luminance value LA0, the output luminance value LA corresponds to a luminance value LAd which is the upper limit luminance value LS of the pixels P. In the example of the line segment F1e, when the input luminance value LB is equal to or larger than the set luminance value LA0, the output luminance value LA corresponds to a luminance value LAe which is the upper limit luminance value LS of the pixels P.

Furthermore, the luminance output information generation unit 40 establishes the first relationship for the second pixels so that, when the input luminance value LB is smaller than the set luminance value LA0, the output luminance value LA is smaller than the upper limit luminance value LS. More specifically, the output gradation value generation unit 34 establishes the first relationship for the second pixels so that, when the input luminance value LB is smaller than the set luminance value LA0, the output luminance value LA becomes smaller as the input luminance value LB becomes smaller. In other words, the first relationship of the second pixels is established such that, when the input luminance value LB is a minimum value (zero here), the output luminance value LA corresponds to a minimum value (zero here), and the output luminance value LA becomes larger proportionately in a linear manner as the input luminance value LB becomes larger from the minimum value (zero), and such that, when the input luminance value LB corresponds to the set luminance value LA0, the output luminance value LA corresponds to the upper limit luminance value LS. For the second pixels, an amount of change in the output luminance value LA when the input luminance value LB changes by a unit amount is smaller than the change by the unit amount in the input luminance value LB. Hence, it could be said that the amount of change (the inclination of the line segments F1d and F1e) in the output luminance value LA of the second pixels when the input luminance value LB changes by a unit amount is smaller than the amount of change (the inclination of the line segment L1a) in the output luminance value LA of the first pixels when the input luminance value LB changes by a unit amount. In other words, it could be said that, for the second pixels, the amount of change in the output luminance value LA when the input luminance value LB changes by a unit amount is compressed in comparison with the first pixels.

Gradation collapse can be suppressed for the second pixels since the amount of change in the output luminance value LA when the input luminance value LB changes by a unit amount is compressed. That is, when the first relationship which is the same as for the line segment F1a of the first pixels is applied to the second pixels for which the upper limit luminance value LS is the luminance value LAd, for the values for which the input luminance value LB is smaller than the set luminance value LA0, the output luminance value LA reaches the upper limit luminance value LS (the luminance value LAd), and even when the input luminance value LB becomes larger, the output luminance value LA which is actually output as the absolute luminance value does not change and continues to be held at the upper limit luminance value LS. In contrast, by compressing the amount of change in the output luminance value LA as indicated by the line segment F1d, the output luminance value LA can be changed until the input luminance value LB reaches the set luminance value LA0, and the gradation collapse of the pixels P when the input luminance value LB changes can be suppressed.

FIG. 8 is a graph illustrating an example of the relationship (second relationship) between the output luminance value LA and the output gradation value T of the second pixels. The luminance output information generation unit 40 calculates the second relationship of the second pixels based on the upper limit luminance value LS. As for the first pixels, the luminance output information generation unit 40 sets the output luminance value LA of the maximum output gradation value $T_{max}$ at the upper limit luminance value LS, and applies the gamma value to calculate, for each of the pixels P, the second relationship between the output luminance value LA and the output gradation value T. A line segment F2*d* represents the second relationship of the second pixels for which the upper limit luminance value LS is the luminance value LAd, and a line segment F2*e* represents the second relationship of the second pixels for which the upper limit luminance value LS is the luminance value LAe. For the second pixels, the maximum value of the output luminance value LA is held at the upper limit luminance value LS in the first relationship, and hence, as represented by the line segment F2*d* and the line segment F2*e*, the luminance output information generation unit 40 establishes the second relationship so that, for the second pixels, the output gradation values T lie in a range from a minimum value (zero here) to a maximum output gradation value $T_{max}$.

As described hereinabove, the luminance output information generation unit 40 generates, for each of the pixels P, luminance output information representing the relationship between the input luminance value LB and the output gradation value T by establishing the first and second relationships. The luminance output information is more particularly established in the first relationship such that the output luminance value LA is equal to or smaller than a set luminance value for both the first and second pixels.

The above-describes processing till generating the luminance output information is a calibration processing for actually generating output gradation values T and displaying the images. The output gradation value calculation unit 42 calculates, based on the luminance output information generated by the luminance output information generation unit 40 through the calibration processing, the output gradation values T for actually displaying images. More specifically, the input luminance value acquisition unit 36 acquires the data input to the display devices 11 and acquires input luminance values LB based on the input data. As mentioned earlier, since the input data contains information of the input luminance values LB, the input luminance value acquisition unit 36 is capable of acquiring the input luminance values LB from the input data. The input luminance value acquisition unit 36 acquires then input luminance value LB for each of the pixels P from the input data for each of the pixels P.

The output gradation value calculation unit 42 calculates the output gradation values T based on the input luminance values LB acquired by the input luminance value acquisition unit 36 and the luminance output information generated by the luminance output information generation unit 40. The luminance output information is generated based on the set luminance value LA0, and hence it could be said that the output gradation value calculation unit 42 calculates the output gradation values T based on the input luminance values LB and the set luminance value LA0. More specifically, the output gradation value calculation unit 42 applies the input luminance values LB acquired by the input luminance value acquisition unit 36 to the luminance output information generated by the luminance output information generation unit 40, and calculates the output gradation values T associated with the input luminance values LB. That is, the output gradation value calculation unit 42 calculates the output luminance value LA which is associated with the input luminance value LB in the first relationship and calculates the output gradation value T which is associated with the output luminance value LA in the second relationship. The output gradation value calculation unit 42 calculates the output gradation value T for each of the pixels P.

Thus, since the output gradation value calculation unit 42 calculates the output gradation value T based on the luminance output information, when an image is displayed with the output gradation value T calculated by the output gradation value calculation unit 42, the output luminance value LA is a value set with the luminance output information. That is, the output luminance value LA is equal to or smaller than the set luminance value LA0 for each of the pixels P. Furthermore, for the first pixels, when the input luminance value LB is equal to or smaller than the set luminance value LA0, the output luminance value LA has the same value as the input luminance value LB, and when the input luminance value LB is larger than the set luminance value LA0, the output luminance value LA is the set luminance value LA0. Further, for the second pixels, when the input luminance value LB is equal to or greater than the set luminance value LA0, the output luminance value LA has the same value as the upper limit luminance value LS, and when the input luminance value LB is less than the set luminance value LA0, the output luminance value LA is smaller than the upper limit luminance value LS.

The output controller 38 outputs the output gradation values T calculated by the output gradation value calculation unit 42. More specifically, the output controller 38 outputs the output gradation values T calculated by the output gradation value calculation unit 42 to the display devices 11 and causes each of the pixels P of the display devices 11 to display the image with each of the output gradation values T.

Figure 9:
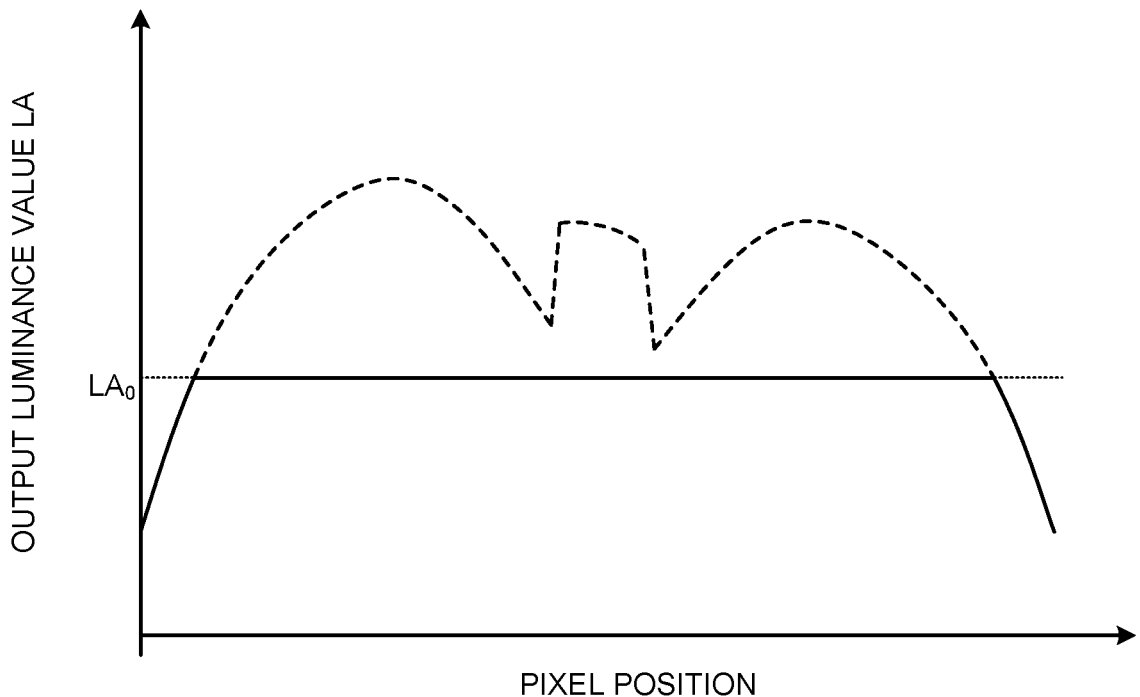
FIG. 9 is a graph illustrating an example of output luminance values when an image is displayed by means of output gradation values which are generated using a method according to the present embodiment.

FIG. 9 is a graph illustrating an example of output luminance values when the image is displayed with the output gradation values which are generated using a method according to the present embodiment. Each of the pixels P has a mutually different upper limit luminance value. Hence, when input data which has the large input luminance value LB uniformly within an image is input, for example, there are positons in which the output luminance values LA can implement the input luminance value LB and positions in which the output luminance values LA cannot implement the input luminance value LB, as indicated by the broken line in FIG. 9, thereby producing a difference in the absolute luminance values and the luminance will be recognized non-uniformly. The region near the center of the image in particular is conspicuous and hence the luminance is recognized non-uniformly. In contrast, when the image is displayed with the output gradation values T generated by the method according to the present embodiment, the output luminance value LA is equal to or smaller than the set luminance value. Hence, as indicated by the solid line in FIG. 9, for a central image in particular, the absolute luminance values can be made uniform, and the recognition of the non-uniform luminance due to a difference in the absolute luminance values can be suppressed. Therefore, according to the present embodiment, when the image is displayed based on input data in which the absolute luminance values are designated, the image can be suitably displayed so as to avoid causing a viewer any discomfort.

A flow of the foregoing processing by the display controller 16 to generate and output the output gradation values T will now be described based on a flowchart. FIG. 10 is a flowchart illustrating the flow of generating and outputting the output gradation values according to the present embodiment. As illustrated in FIG. 10, the display controller 16 acquires the upper limit luminance value LS for each of the pixels P by the upper limit luminance value acquisition unit 30 (step S10), and sets the set luminance value LA0 based on the upper limit luminance value LS by the set luminance value setting unit 32 (step S12). The set luminance value setting unit 32 sets the set luminance value LA0 so that the set luminance value LA0 is smaller than the maximum upper limit luminance value $LS_{max}$ and, furthermore, is larger than the minimum upper limit luminance value $LS_{min}$ and equal to or smaller than the boundary upper limit luminance value LSa. Further, the display controller 16 generates the luminance output information for each of the pixels P based on the set luminance value LA0 by the luminance output information generation unit 40 (step S14). The calibration processing is thus completed.

Further, the display controller 16 acquires the input luminance value LB from the input data by the input luminance value acquisition unit 36 (step S16) and generates the output gradation value T for each of the pixels P based on the input luminance value LB and the luminance output information by the output gradation value calculation unit 42 (step S18). The display controller 16 causes the display devices 11 to output the generated output gradation values T (step S20) by the output controller 38 and cause the display devices 11 to display the image with the output gradation values T.

As described hereinabove, the display controller 16 according to the present embodiment controls the displaying of the images by the display devices 11, and includes the upper limit luminance value acquisition unit 30, the set luminance value setting unit 32, the input luminance value acquisition unit 36, the output gradation value generation unit 34, and the output controller 38. The upper limit luminance value acquisition unit 30 acquires, at least for each of the pixels P of the display devices 11, the upper limit luminance value LS which is the upper limit value of the absolute luminance values and which can be displayed by the display devices 11. The set luminance value setting unit 32 sets the set luminance value LA0 so that the set luminance value LA0 is smaller than the maximum upper limit luminance value $LS_{max}$ which is the maximum value among each of the upper limit luminance values LS for each of the pixels P. The input luminance value acquisition unit 36 acquires, for each of the pixels P, the input luminance value LB which is the absolute luminance value to be displayed by the display devices 11, based on the data input to the display devices 11. The output gradation value generation unit 34 generates the output gradation value T based on the input luminance value LB and the set luminance value LA0. The output controller 38 outputs the output gradation value T calculated by the output gradation value generation unit 34. The output gradation value generation unit 34 generates the output gradation value T for each of the pixels P so that each of the output luminance values LA which is the absolute luminance value displayed by each of the pixels P is equal to or smaller than the set luminance value LA0 for each of the pixels P.

Since the upper limit luminance value LS for each of the pixels sometimes differs, the display devices 11 cannot display the image suitably based on the input data designating the absolute luminance values with the non-uniform absolute luminance values in the image to be displayed due to the difference in the upper limit luminance values LS. In contrast, according to the display controller 16 of the present embodiment, since each of the output luminance values LA for each of the pixels P is kept equal to or smaller than the set luminance value LA0, even when there are differences in the upper limit luminance value LS, the non-uniformity of the absolute luminance value in the image to be displayed is suppressed, thus enabling the image to be displayed suitably.

Furthermore, the upper limit luminance value acquisition unit 30 acquires, as the upper limit luminance value LS, the absolute luminance value when each of the pixels P is displayed with the maximum output gradation value $T_{max}$.

According to the display controller 16 of the present embodiment, since the output luminance value of the image which is actually displayed when each of the pixels P is displayed with the maximum output gradation value $T_{max}$ is set as the upper limit luminance value LS, the upper limit luminance value LS can be detected highly accurately, and the set luminance value can be suitably set. Therefore, according to the display controller 16 of the present embodiment, the image can be displayed more suitably.

Furthermore, for the first pixels for which the upper limit luminance value LS is equal to or greater than the set luminance value LA0, the output gradation value generation unit 34 generates the output gradation values T so that, when the input luminance value LB is equal to or smaller than the set luminance value LA0, the output luminance value LA is the input luminance value LB. Furthermore, the output gradation value generation unit 34 generates the output gradation values T for the first pixels so that, when the input luminance value LB is larger than the set luminance value LA0, the output luminance value LA is the set luminance value LA0. For the first pixels for which the upper limit luminance value LS is equal to or larger than the set luminance value LA0, the display controller 16 holds the output luminance value LA which is actually output as the absolute luminance value at the set luminance value LA0 even when the input luminance value LB exceeds the set luminance value LA0. In addition, when the input luminance value LB is less than the set luminance value LA0, the output luminance value LA which is actually output has the same value as the input luminance value LB. Hence, according to the display controller 16 of the present embodiment, non-uniform luminance is suppressed by holding the upper limit of the output luminance value LA at the set luminance value LA0, and when the input luminance value LB is smaller than the set luminance value LA0, the luminance is set as instructed by the input luminance value LB, thus enabling the image to be displayed more suitably.

Furthermore, for the second pixels for which the upper limit luminance value LS is smaller than the set luminance value LA0, the output gradation value generation unit 34 generates the output gradation values T so that, when the input luminance value LB is equal to or larger than the set luminance value LA0, the output luminance value LA is the upper limit luminance value LS. Further, the output gradation value generation unit 34 generates the output gradation values T for the second pixels so that, when the input luminance value LB is less than the set luminance value LA0, the output luminance value LA is smaller than the upper limit luminance value LS. The display controller 16 sets the output luminance value LA as the upper limit luminance value LS when the input luminance value LB is equal to or larger than the set luminance value LA0, and sets the output luminance value LA to be less than the upper limit luminance value LS when the input luminance value LB is less than the set luminance value LA0. Accordingly, the display controller 16 is capable of changing the output luminance value LA according to the input luminance value LB and enables suppression of gradation collapse.

Furthermore, the output gradation value generation unit 34 generates the output gradation values T for the second pixels so that, when the input luminance value LB is less than the set luminance value LA0, the output luminance value LA becomes smaller as the input luminance value LB becomes smaller. The display controller 16 is capable of suitably suppressing the gradation collapse by changing the output luminance value LA according to the input luminance value LB when the input luminance value LB is less than the set luminance value LA0.

Further, the multiple display devices 11 are projection devices for projecting images. Furthermore, by projecting the images by the multiple display devices so that parts of the images are superimposed on each other, one whole image is constituted by the multiple images. The set luminance value setting unit 32 sets the set luminance value LA0 based on the upper limit luminance values LS of the pixels P which project the images onto a region wherein the parts of the images are superimposed on each other. In a so-called multi-projector that superimposes parts of the images from the multiple display devices 11, since changes in the upper limit luminance values LS are complex in, for example, a region in which the images are superimposed, the problem of non-uniform luminance may occur. In contrast, the display controller 16 according to the present embodiment sets the set luminance value LA0 based on the upper limit luminance values LS of the pixels P in the region in which the images are superimposed, and hence the luminance can be uniform suitably in the multi-projector. Thus, although the display controller 16 according to the present embodiment is effective for the multi-projector, the display controller 16 according to the present embodiment is not limited to being applied to the multi-projector and may be applied to one display device 11.

Furthermore, the set luminance value setting unit 32 preferably sets, as the set luminance value LA0, a minimum value (the boundary upper limit luminance value LSa in the example of FIG. 4) for the upper limit luminance values LS of the pixels P which project the images onto the region in which the parts of the images are superimposed. By setting, as the set luminance value LA0, the upper limit luminance value LS of the pixels P for which the upper limit luminance value LS is minimum among the pixels P in the region in which the parts of the images are superimposed, the luminance can be uniform suitably in the multi-projector in particular.

Moreover, the display system 1 according to the present embodiment includes the display controller 16 and the display device 11. Hence, the display system 1 is capable of causing the display device 11 to display the image suitably.

According to the present application, an image can be suitably displayed when an image is displayed based on input data in which an absolute luminance value is designated.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display controller for controlling displaying of at least one image by at least one display device, comprising:
    an upper limit luminance value acquisition unit configured to acquire, for at least one of pixels of the at least one display device, an upper limit luminance value which is an upper limit value of an absolute luminance value which is capable of being displayed by the at least one display device;
    a set luminance value setting unit configured to set a set luminance value which is a set value of the absolute luminance value displayed by the at least one display device so that the set luminance value is smaller than a maximum value among the upper limit luminance values for each of the pixels;
    an input luminance value acquisition unit configured to acquire, for each of the pixels, an input luminance value which is the absolute luminance value to be displayed by the at least one display device based on data input to the at least one display device;
    an output gradation value generation unit configured to generate an output gradation value based on the input luminance value and the set luminance value; and
    an output controller configured to output the output gradation value generated by the output gradation value generation unit,
    wherein the output gradation value generation unit is further configured to generate the output gradation value for each of the pixels so that an output luminance value which is the absolute luminance value to be displayed by each of the pixels is equal to or smaller than the set luminance value for each of the pixels.

2. The display controller according to claim 1, wherein the upper limit luminance value acquisition unit is further configured to acquire, as the upper limit luminance value, the absolute luminance value when each of the pixels is displayed with a maximum output gradation value.

3. The display controller according to claim 1, wherein, for each of the pixels for which the upper limit luminance value is equal to or larger than the set luminance value, the output gradation value generation unit is further configured to generate the output gradation value so that, when the input luminance value is equal to or smaller than the set luminance value, the output luminance value corresponds to the input luminance value, and when the input luminance value is larger than the set luminance value, the output luminance value corresponds to the set luminance value.

4. The display controller according to claim 1, wherein, for each of the pixels for which the upper limit luminance value is smaller than the set luminance value, the output gradation value generation unit is further configured to generate the output gradation value so that, when the input luminance value is equal to or larger than the set luminance value, the output luminance value corresponds to the upper limit luminance value, and when the input luminance value is smaller than the set luminance value, the output luminance value is smaller than the upper limit luminance value.

5. The display controller according to claim 4, wherein, for each of the pixels for which the upper limit luminance value is smaller than the set luminance value, the output gradation value generation unit is further configured to generate the output gradation value so that, when the input luminance value is smaller than the upper limit luminance value, the output luminance value becomes smaller as the input luminance value becomes smaller.

6. The display controller according to claim 1, wherein the multiple display devices as projection devices for projecting the images are provided to project the images so that parts of the images are superimposed on each other and one whole image is constituted by the multiple images, and
    the set luminance value setting unit is further configured to set the set luminance value based on the upper limit luminance value of the pixels which project the images onto a region where the parts of the images are superimposed on each other.

7. The display controller according to claim 6, wherein the set luminance value setting unit is further configured to set, as the set luminance value, a minimum value of the upper limit luminance values of the pixels which project the images onto the region where the parts of the images are superimposed on each other.

8. A display system comprising the display controller according to claim 1 and the at least one display device.

9. A display control method for controlling displaying of at least one image by at least one display device, comprising:
- an upper limit luminance value acquisition step of acquiring, for at least one of pixels of the at least one display device, an upper limit luminance value which is an upper limit value of an absolute luminance value which is capable of being displayed by the at least one display device;
- a set luminance value setting step of setting a set luminance value which is a set value of the absolute luminance value displayed by the display device so that the set luminance value is smaller than a maximum value among the upper limit luminance values for each of the pixels;
- an input luminance value acquisition step of acquiring, for each of the pixels, an input luminance value which is an absolute luminance value to be displayed by the at least one display device based on data input to the at least one display device;
- an output gradation value generation step of generating an output gradation value based on the input luminance value and the set luminance value; and
- an output control step of outputting the output gradation value generated at the output gradation value generation step,
- wherein the output gradation value generation step further generates the output gradation value for each of the pixels so that an output luminance value which is the absolute luminance value to be displayed by each of the pixel is equal to or smaller than the set luminance value for each of the pixels.

10. An non-transitory storage medium that stores a program that causes a computer to execute a display control method for controlling displaying of an image by a display device, the program causing the computer to execute:
- an upper limit luminance value acquisition step of acquiring, for at least one of pixels of the at least one display device, an upper limit luminance value which is an upper limit value of an absolute luminance value which is capable of being displayed by the at least one display device;
- a set luminance value setting step of setting a set luminance value which is a set value of the absolute luminance value displayed by the display device so that the set luminance value is smaller than a maximum value among the upper limit luminance values for each of the pixels;
- an input luminance value acquisition step of acquiring, for each of the pixels, an input luminance value which is an absolute luminance value to be displayed by the at least one display device based on data input to the at least one display device;
- an output gradation value generation step of generating an output gradation value based on the input luminance value and the set luminance value; and
- an output control step of outputting the output gradation value generated at the output gradation value generation step,
- wherein the output gradation value generation step further generates the output gradation value for each of the pixels so that an output luminance value which is the absolute luminance value to be displayed by each of the pixel is equal to or smaller than the set luminance value for each of the pixels.

* * * * *